United States Patent
Dunsmore et al.

(10) Patent No.: US 8,028,006 B2
(45) Date of Patent: Sep. 27, 2011

(54) METHOD AND APPARATUS FOR EXCHANGING SUB-HIERARCHICAL STRUCTURES WITHIN A HIERARCHICAL FILE SYSTEM

(75) Inventors: Silas W. Dunsmore, Auburn, CA (US); Tom J. Benning, Rocklin, CA (US); Harvie H. Branscomb, Carbondale, CO (US)

(73) Assignee: STANDOFFBYSOFT LLC, Reno, NV (US)

(*) Notice: Subject to any disclaimer, the term of this patent is extended or adjusted under 35 U.S.C. 154(b) by 467 days.

(21) Appl. No.: 12/173,391

(22) Filed: Jul. 15, 2008

(65) Prior Publication Data

US 2008/0313217 A1   Dec. 18, 2008

Related U.S. Application Data

(63) Continuation of application No. 10/608,722, filed on Jun. 26, 2003, now Pat. No. 7,401,092.

(51) Int. Cl.
*G06F 17/30* (2006.01)

(52) U.S. Cl. .................................. 707/809; 707/829

(58) Field of Classification Search .................. 707/809, 707/829
See application file for complete search history.

(56) References Cited

U.S. PATENT DOCUMENTS

| | | |
|---|---|---|
| 5,230,047 A | 7/1993 | Frey, Jr. et al. |
| 5,469,573 A | 11/1995 | McGill, III et al. |
| 5,561,799 A | 10/1996 | Khalidi et al. |
| 5,664,186 A | 9/1997 | Bennett et al. |
| 5,778,371 A | 7/1998 | Fujihara |
| 5,875,444 A | 2/1999 | Hughes |
| 5,956,718 A | 9/1999 | Prasad et al. |
| 6,016,553 A | 1/2000 | Schneider et al. |
| 6,073,220 A | 6/2000 | Gunderson |
| 6,101,497 A | 8/2000 | Ofek |
| 6,128,734 A | 10/2000 | Gross et al. |
| 6,175,904 B1 | 1/2001 | Gunderson |
| 6,192,376 B1 | 2/2001 | Kincaid et al. |
| 6,199,178 B1 | 3/2001 | Schneider et al. |
| 6,205,527 B1 | 3/2001 | Goshey et al. |
| 6,240,527 B1 | 5/2001 | Schneider et al. |

(Continued)

OTHER PUBLICATIONS

"Filesystems: A Brief Introduction"; http://www.bellevuelinux.org/filesystem.html; Apr. 16, 2004 pp. 1-8.

*Primary Examiner* — John E Breene
*Assistant Examiner* — Dennis Myint
(74) *Attorney, Agent, or Firm* — Carter, Deluca, Farrell & Schmidt, LLP

(57) ABSTRACT

A method for replacing a first sub-hierarchy of a New Technology File System hierarchical filesystem (NTFS HFS) with a second sub-hierarchy is disclosed. The first sub-hierarchy includes a first root directory having at least one special system file, and a first plurality of files. The second sub-hierarchy includes a second root directory located in a second location of the HFS, a second plurality of files and at least one placeholder file corresponding to the at least one special system file. The method includes the steps of configuring the first plurality of files to branch from the first root directory once the first root directory is accessed through the second location, exchanging the first plurality of files with the second plurality of files, and exchanging at least one directory pointer corresponding to the at least one special system file with at least one directory pointer corresponding to the at least one placeholder file.

16 Claims, 6 Drawing Sheets

U.S. PATENT DOCUMENTS

| | | |
|---|---|---|
| 6,253,300 B1 | 6/2001 | Lawrence et al. |
| 6,289,426 B1 | 9/2001 | Maffezzoni et al. |
| 6,317,845 B1 | 11/2001 | Meyer et al. |
| 6,366,988 B1 | 4/2002 | Skiba et al. |
| 6,374,363 B1 | 4/2002 | Wu et al. |
| 6,374,366 B1 | 4/2002 | Maffezzoni |
| 6,377,259 B1 | 4/2002 | Tenev et al. |
| 6,381,615 B2 | 4/2002 | Gaither et al. |
| 6,381,694 B1 | 4/2002 | Yen |
| 6,385,707 B1 | 5/2002 | Maffezzoni |
| 6,401,093 B1 | 6/2002 | Anand et al. |
| 6,430,703 B1 | 8/2002 | Connor et al. |
| 6,446,085 B1 | 9/2002 | Gusler et al. |
| 6,477,629 B1 | 11/2002 | Goshey et al. |
| 6,480,944 B2 | 11/2002 | Bradshaw et al. |
| 6,532,535 B1 | 3/2003 | Maffezzoni et al. |
| 6,549,978 B2 | 4/2003 | Mansur et al. |
| 6,615,365 B1 | 9/2003 | Jenevein et al. |
| 6,671,786 B2 | 12/2003 | Wang et al. |
| 6,775,679 B2 | 8/2004 | Gupta |
| 6,915,420 B2 | 7/2005 | Hensley |
| 7,051,251 B2 | 5/2006 | Moore et al. |
| 7,203,732 B2 | 4/2007 | McCabe et al. |
| 7,401,092 B2 | 7/2008 | Dunsmore et al. |
| 2002/0049883 A1 | 4/2002 | Schneider et al. |
| 2002/0143783 A1 | 10/2002 | Bakalash et al. |
| 2003/0065780 A1* | 4/2003 | Maurer et al. ............... 709/225 |
| 2004/0133790 A1* | 7/2004 | Hensley ..................... 713/191 |

* cited by examiner

METHOD AND APPARATUS FOR EXCHANGING SUB-HIERARCHICAL STRUCTURES WITHIN A HIERARCHICAL FILE SYSTEM

CROSS-REFERENCE TO RELATED APPLICATION

The present application is a continuation application of a U.S. application Ser. No. 10/608,722 filed on Jun. 26, 2003, now U.S. Pat. No. 7,401,092, the entire contents of which is incorporated by reference herein.

BACKGROUND OF THE INVENTION

1. Field of the Invention

The present invention generally relates to managing a plurality of files and directories within a hierarchical file system, and in particular to a system and method for exchanging a first sub-hierarchy having a root directory coinciding with the root directory of a hierarchical file system with a sub-hierarchy included in the hierarchical file system.

2. Background of Related Art

A computer system is capable of storing large amounts of information, particularly on large capacity permanent storage media known as hard drives. File systems, particularly hierarchical file systems (HFSs), are currently widely used for providing organization of stored information so that desired information can be easily and quickly located and retrieved. In an HFS, user data is organized into variably sized units known as files. Files are then organized into groups known as directories. Directories may contain files and may also contain other directories, known as subdirectories. This structure forms a branching tree, or hierarchy. The topmost node of this tree is a special directory known as the root directory. The hard drive is divided into physical sections known as sectors. The hard drive can also be divided into one or more logical groups of sectors known as partitions. The HFS provides a mapping between disk sectors and user data, and maintains internal housekeeping information for storing the structural relationship between directories, sector usage tables, etc.

The file systems are typically stored on non-archival rotating storage media which are subject to mechanical failures of the media and/or drive thereof, endangering the viability of the data stored therein. In addition, inadvertent or malicious failures may occur in software within the file system itself (e.g., corruption) and/or data stored therein.

The operating system of the computer is typically provided with one or more file system drivers for enabling the operating system to interpret the file system's mapping for accessing and/or processing data stored within the file system. When a file system fails or becomes corrupted, the operating system may be unable, partially or completely, to interpret the file system. Furthermore, the operating system's data and executable code is typically stored in files of the file system, such that viability of the operating system is endangered when the file system fails or is corrupted.

A popular method for protection of stored data is copying (i.e., backing up) the file system to other media (i.e., backup) and recovering from a corruption occurrence by restoring the corrupted file system from the backup data. In both of these cases, the user is typically inconvenienced either during the backup process or the recovery process, since the computer system may not be useable during that time. Furthermore, the backup media may not be available when a recovery process is necessary. In addition, once the recovery process has been initiated, it is usually not possible to cancel or reverse the recovery.

In another popular method for protection against corruption within a file system, operating systems typically provide repair tools for checking the file system and performing repairs. If the operating system is itself stored on the corrupted file system, a situation may develop in which the operating system cannot be started because of the corruption, preventing use of the repair tool to repair the corruption.

Typically the repair tool returns the file system to a default condition, often overwriting or deleting files which are desirable to be kept, or making these files inaccessible by deleting the applications needed to access them. Furthermore, the standard repair tool typically checks and repairs a file system which resides in one partition. Backup data outside of the file system, such as backup data stored on another partition or medium, are not typically checked for corruption or repaired by the repair tool.

In order to increase speed and transparency for the backup or recovery processes, it is desirable to store one or more sets of backup data on the same disk that stores the original file system. Recently, such backup systems have been developed. However, a recovery process typically includes replacing the corrupted file system, in which the current version of the operating system resides, with a backed up file system having a backed up version of the operating system, without the ability to replace selected portions of the file system. Accordingly, uncorrupted portions of the operating system, application programs and user data which resided in the corrupted file system are replaced by corresponding backup data obtained at a previous point in time, causing a loss of updated information.

Another disadvantage to such existing backup systems is the requirement for a special device driver(s) for the backup medium, limiting compatibility between available different storage devices and the operating system.

Furthermore, one class of solution of existing backup systems copies the backup file system onto the same medium as the original file system, however the original and backup file systems are each stored in different respective partitions, causing the waste of unused disk space in each partition as well as lack of continuous monitoring and maintenance of the backup data by the repair tool.

It is an object of the present invention to provide a method and apparatus for maintaining multiple copies of a file system's data within the file system, and for replacing selectable portions of data from a copy currently being used as a working file system with corresponding data from a different copy by manipulating the file system's internal housekeeping information.

It is another object of this invention to provide a method of using an individual copy of the file system's data without affecting corresponding portions in another copy.

It is another object of the present invention to store the multiple copies of the file system in a single partition of a single physical or virtual storage medium.

It is still another object of the present invention to exchange an individual copy of the multiple copies of the file system's data that is being used as a working file system with another copy.

Finally, it is an object of the present invention to exchange an individual copy of the multiple copies of the file system's data with another copy, where the replacement is reversible.

SUMMARY OF THE INVENTION

According to one aspect of the present disclosure a method for replacing a first sub-hierarchy of a New Technology File System (NTFS) hierarchical filesystem (NTFS HFS) with a second sub-hierarchy is disclosed. The method includes the step of providing for the first sub-hierarchy to include a first root directory having at least one special system file, wherein the first sub-hierarchy includes a first plurality of files configured to branch from the first root directory. The method also includes the step of providing for the second sub-hierarchy to include a second root directory located in a second location of the HFS, the second root directory having at least one placeholder file corresponding to the at least one special system file, wherein the second sub-hierarchy includes a second plurality of files configured to branch from the second root directory. The method further includes the steps of replacing the first sub-hierarchy with the second sub-hierarchy comprising the step of: configuring the first plurality of files to branch from the first root directory once the first root directory is accessed through the second location, exchanging the first plurality of files with the second plurality of files, and exchanging at least one directory pointer corresponding to the at least one special system file with at least one directory pointer corresponding to the at least one placeholder file.

According to another aspect of the disclosure, a computer system is disclosed. The system includes at least one processor and a New Technology File System (NTFS) hierarchical filesystem (HFS) stored on a storage medium accessible by the at least one processor and including a single parentless root directory. The NTFS HFS includes a first sub-hierarchy having a first root directory located in a first location of the HFS associated with the single parentless root directory of the HFS through at least one internal pointer, the first root directory having at least one special system file, wherein the first sub-hierarchy includes a first plurality of files configured to branch from the first root directory and a second sub-hierarchy having a second root directory located in a second location of the HFS, the second root directory having at least one placeholder file corresponding to the at least one special system file, wherein the second sub-hierarchy includes a second plurality of files configured to branch from the second root directory. The system further includes memory storing a set of programmable instructions executable on the at least one processor for replacing the first sub-hierarchy with the second sub-hierarchy comprising the step of: associating the second root directory and the single parentless root directory of the HFS through the at least one internal pointer. The associating step further comprises the steps of: configuring the first plurality of files to branch from the first root directory once the first root directory is accessed through the second location; exchanging the first plurality of files with the second plurality of files; and exchanging at least one directory pointer corresponding to the at least one special system file with at least one directory pointer corresponding to the at least one placeholder file.

A method for replacing a first sub-hierarchy of a New Technology File System (NTFS) hierarchical filesystem (NTFS HFS) with a second sub-hierarchy is also contemplated by the present disclosure. The first sub-hierarchy includes a first root directory having at least one special system file, and a first plurality of files configured to branch therefrom, the second sub-hierarchy including a second root directory located in a second location of the HFS and a second plurality of files configured to branch from the second root directory, the second root directory having at least one placeholder file corresponding to the at least one special system file. The method includes the steps of: configuring the first plurality of files to branch from the first root directory once the first root directory is accessed through the second location, exchanging the first plurality of files with the second plurality of files and exchanging at least one directory pointer corresponding to the at least one special system file with at least one directory pointer corresponding to the at least one placeholder file.

BRIEF DESCRIPTION OF THE DRAWINGS

Various embodiments of the invention will be described herein below with reference to the figures wherein.

DESCRIPTION OF THE PREFERRED EMBODIMENTS

In the present invention, a method and system are provided for changing the configuration of a single hierarchical file system (HFS) by exchanging first and second sub-hierarchies of at least two sub-hierarchies included within the HFS so that before the exchange procedure the first sub-hierarchy is a working file system of the HFS, as described further below, and after the exchange procedure the second sub-hierarchy is the working file system of the HFS, where a root directory of the working file system is located at the root directory of the HFS, and where the root directory of the HFS is the top most node of the HFS, which typically does not have a parent node (directory, file or equivalent), i.e., the HFS is not included in a different hierarchical file system, and/or the root directory of the HFS is the path through which a currently executing operating system accesses the HFS. Preferably the HFS further includes special files, which may include files and/or directories, which are accessible via the root directory and by the current working file system.

Figure 1:
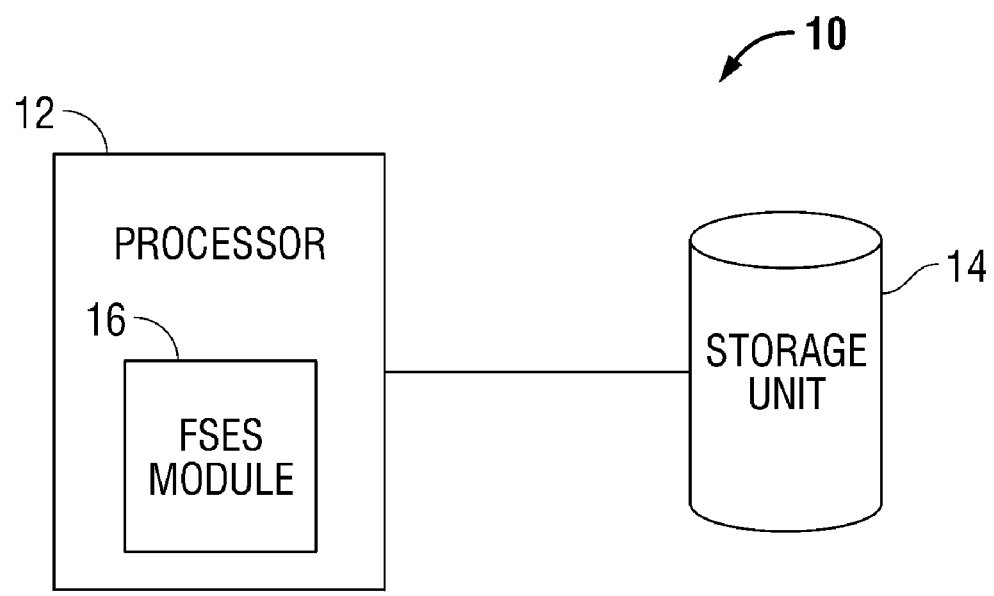
FIG. 1 is a block diagram of a computer system in accordance with the present invention.

With reference to FIG. 1, a computer system designated generally by reference numeral 10 is shown having at least one processor 12 accessing at least one data storage unit 14. The at least one data storage unit 14 typically includes a rotating disk, also known as a hard drive storing data in a HFS formation implemented in HFS implementations, such as FAT32 or NTFS. The HFS formation includes a root area through which other areas of the HFS are accessible by direct or indirect connection and/or containment. The at least one data storage unit 14 may span several storage devices, yet form a single volume. The computer system 10 further includes a file system exchange software (FSES) module 16 including a series of programmable instructions executable by the at least one processor 12 for implementing the exchange of sub-hierarchies, as described in greater detail below.

The at least two sub-hierarchies include a working file system sub-hierarchy (referred to throughout the present application as the working file system) and at least one alternate file system sub-hierarchy (referred to throughout the present application as the at least one alternate file system). Each sub-hierarchy includes a respective root area through which other areas of the respective sub-hierarchy are accessible by direct or indirect connection and/or containment.

In a first embodiment, using one exemplary implementation, the working file system includes files and/or directories and their contents in the root directory, and files and/or directories and their contents accessible therefrom, e.g., branching therefrom, not including at least a directory herein referred to as the backup container directory, and files and/or directories accessible therefrom and their contents, e.g., branching therefrom. Essentially, the working file system includes the files and/or directories that would be typically included in a conventional HFS. The at least one alternate file system is accessible via the backup container directory, including files and/or directories and their contents accessible therefrom, e.g., branching therefrom. Corresponding root areas of the respective alternate file systems are accessible via the backup container directory. Each alternate file system typically corresponds to a different backup or a different configuration. In the present embodiment, the individual alternate file systems as well as the working file system do not overlap one another, i.e., are mutually exclusive. Preferably, the backup container directory does not overlap the working file system, but is linked to the working file system.

The at least one alternate file system is preferably in a hidden area to which access by a user and the working file system (including an operating system included therein) is denied without authorization. The backup container directory is preferably a hidden area to which access by a user is ordinarily denied. The backup container directory is typically limited to being accessed when privileged access is granted to one or more alternate file systems, such as for an exchange process or updating of one or more alternate file systems, as described further below.

In another embodiment, using a different implementation, such as one that does not include the backup container directory, the sub-hierarchies may overlap one another, i.e., are not mutually exclusive. Furthermore, the at least two sub-hierarchies may be linked directly or indirectly to one another, including via overlapping portions or via non-overlapping portions. The respective root directories of the alternate file systems are located in locations other than the root directory of the HFS. The root directory of an alternate file system may be located in a location used (i.e., occupied) by another alternate file system or the working file system. When an exchange procedure is performed, the links are reconfigured. Any portion of the at least one alternate file system that is not included in the working file system is preferably hidden preventing access by a user and the working file system (including an operating system included therein) without authorization.

Other implementations are envisioned. For example, files and/or directories may be included that are accessible via the root directory but not included in the working file system or the at least one alternate file system. In another example, files and/or directories may be included that are accessible via the backup container directory, but are not included in the working file system or the at least one alternate file system.

With regards to either embodiment, the FSES module 16 is storable on a computer-readable medium, such as RAM, a hard drive, ROM, flash memory, a CD-ROM, a smart card, a diskette, etc., or transmitted by propagated signals. The series of programmable instructions may be implemented in configurations including firmware, logic circuitry, software or a combination thereof.

The FSES module 16 is responsive to a request by a privileged user or the processor for reconfiguring the HFS to exchange a selected alternate file system of the at least one alternate file system with the current working file system, so that the selected alternate file system becomes the new working file system, and preferably, the current working file system becomes an alternate file system. Alternatively, the current working file system may be deleted or discarded.

The present invention is usable for many applications, including backups, multi-user environments, and system upgrading. For example, an alternate file system may include a backup copy of the working file system. Should a failure occur in a critical file of the working file system, the computer can be restored to full usefulness by exchanging the alternate file system including the backup copy with the working file system.

In another example, individual alternate file systems may be stored, each providing a respective customized environment, such as for use with multiple users. The individual alternate file systems may include different operating systems. Each user could then choose their respective customized environment by selecting an alternate file system to be the working file system.

In still another example, two of the sub-hierarchies may include identical contents. An upgrade is subsequently performed to one of the sub-hierarchies which is designated the working file system, while the other sub-hierarchy, which is designated an alternate file system, remains unchanged. Upgrades are notoriously prone to cause problems. If the user accepts the upgrade, the alternate file system may be updated to include the upgrade. Alternatively, if the user rejects the upgrade, the working file system is exchanged with the unchanged alternate file system.

Exchange of the current working file system with the selected alternate file system in accordance with the present invention, herein referred to as a file system exchange, includes exchanging execution of operating systems and exchanging access to and association with the typically immutable root directory of the HFS and data included in and associated thereto. Advantages to the present invention include minimal down time when changing the file system, since actual copying or modification of data is minimized during the file system exchange. In addition, once the file system exchange operation is performed, it is reversible by the same process. Updating the contents of alternate file systems can be performed without interrupting the normal operation of the computer. With proper privileges, files within the alternate file systems may be accessed, which provides the ability to update selected files of a selected alternate file system, and to recover individual files without performing a file system exchange.

Since all of the sub-hierarchies use the same volume, system volume, pool of physical disk blocks, and/or a single data partition, the multiple copies of data occupy a minimal amount of space. Furthermore, file system maintenance applications may traverse the contents of the entire HFS, including all alternate file systems, thus maintaining integrity of all areas.

Figure 2A:
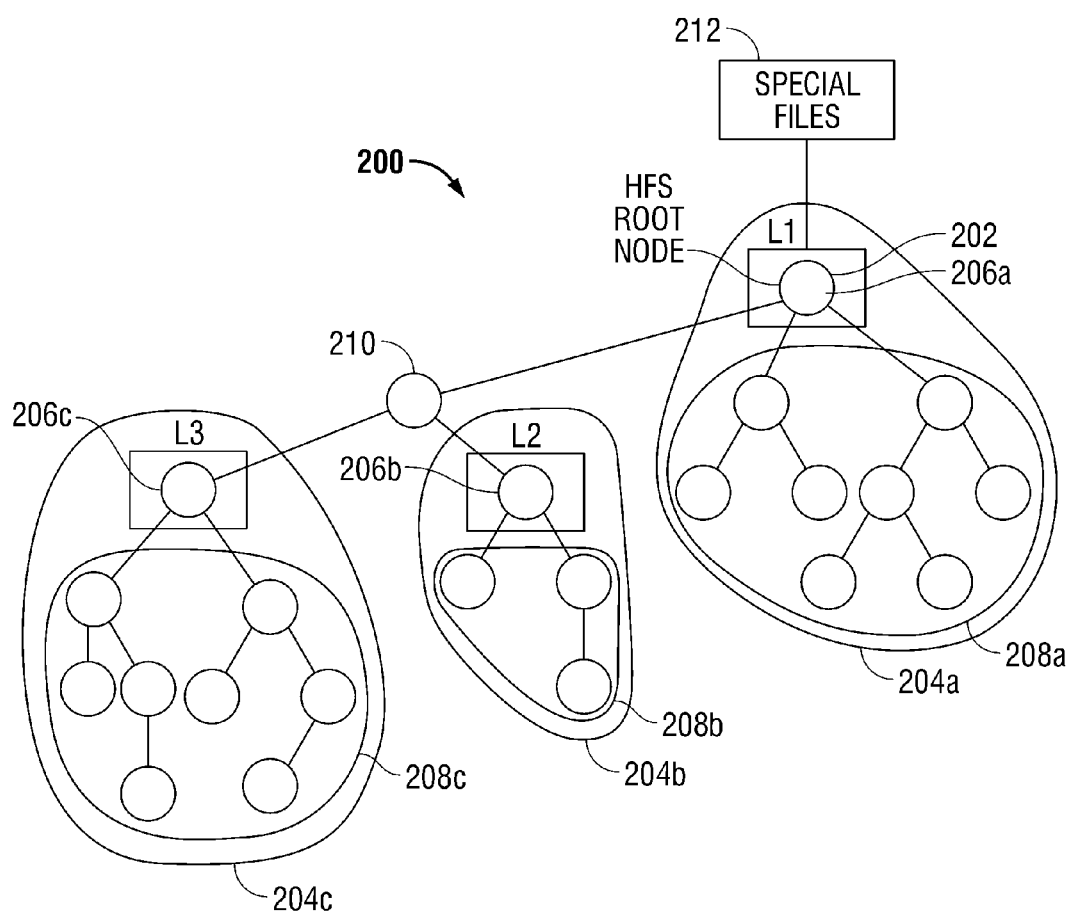
FIG. 2A is a tree diagram of an hierarchical file system in a first state in accordance with the present invention.
Figure 2B:
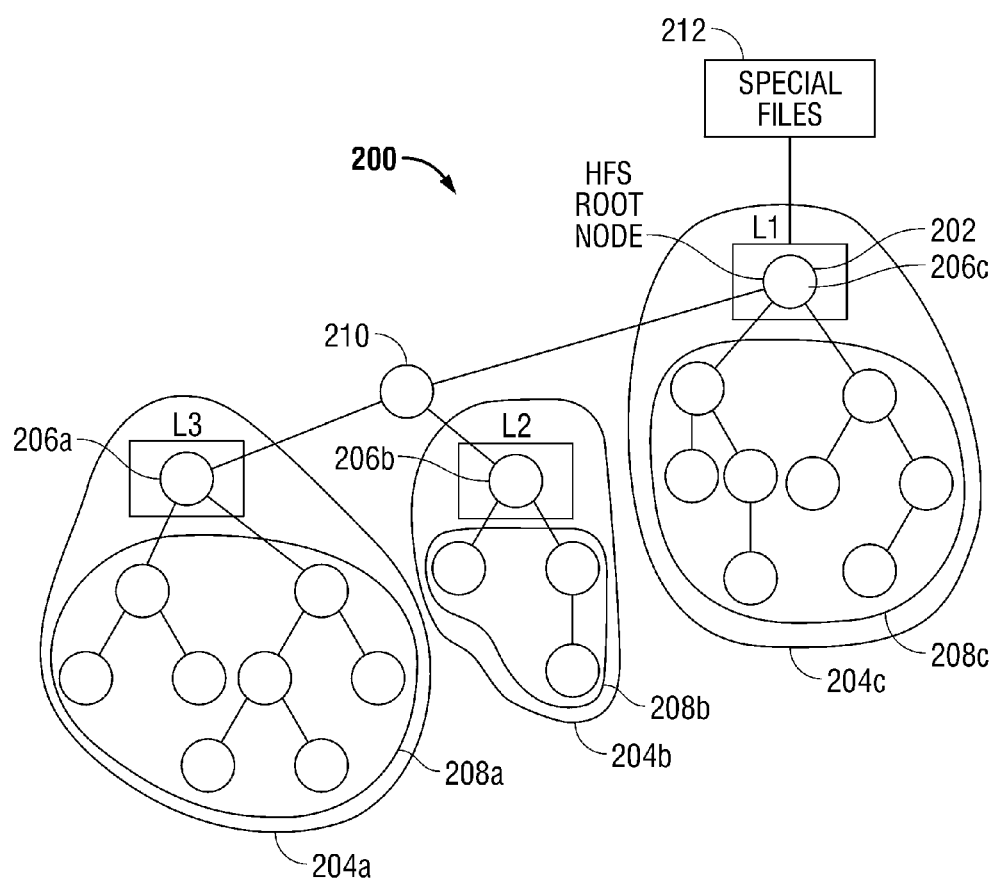
FIG. 2B is a tree diagram of the hierarchical file system of FIG. 2A in a second state.

Referring to FIGS. 2A and 2B, with regard to the first embodiment, an exemplary HFS 200 is shown having a top most node configured as root directory 202, which is the true root directory of the HFS 200, i.e., all files and directories not included in the root directory 202 are accessible, e.g., branch (directly or indirectly) from the root directory 202. HFS 200 is shown to include first, second and third exemplary sub-hierarchies 204a, 204b, 204c, where each sub-hierarchy includes a respective sub-hierarchy root node configured respectively as sub-hierarchy root directories 206a, 206b, 206c, and a plurality of files 208a, 208b, 208c including all files and files in all directories depending (i.e. branching) from the respective root directory 206a, 206b, 206c. In the exemplary implementation shown, specially designated directories and/or files, including a backup container directory 210 and other special files 212 (which may include files and/or subdirectories), accessible from the root directory 202, are not included in any of the sub-hierarchies 204a, 204b, 204c. Examples of special files 212 include a recycle bin, system volume information, volume labels and page file.

In FIG. 2A, HFS 200 is shown in a first state, state "A", in which the sub-hierarchy root directory 206a is located in the root directory 202 located at location L1, and the other sub-hierarchy root directories 206b, 206c are located at other assigned locations L2, L3, respectively. The plurality of files 208a, 208b, 208c are configured to branch from their respective root directories 206a, 206b, 206c. Sub-hierarchy 204a is currently the working file system storing an operating system which is executing on a processor of the computer accessing the HFS, and sub-hierarchy 204a is being accessed by the operating system. Sub-hierarchies 204b and 204c are both alternate file systems descending from the backup container directory 210. Operating systems stored within the sub-hierarchies 204b and 204c are not currently executing. Special files 212 are accessible via the current working file system by the currently executing operating system.

FIG. 2B shows HFS 200 in a second state, state "B", in which sub-hierarchy root directory 206c is located in the root directory 202, located at location L1 and the other sub-hierarchy root directories 206a, 206b are located at assigned locations L3, L2, respectively. The plurality of files 208a, 208c are re-configured to branch from their respective root directories 206a, 206c. Sub-hierarchies 204a and 204c have been exchanged, and sub-hierarchy 204c is currently the working file system. There is not a need for the special files 212 to be exchanged or copied. Instead, special files 212 are accessible via the current working file system after the exchange, i.e., by the currently executing operating system, which is the operating system stored by the current working file system, sub-hierarchy 204c. Sub-hierarchies 204b and 204a are both alternate file systems descending from the backup container directory 210. Operating systems stored within the sub-hierarchies 204b and 204a are not currently executing.

Figure 3:
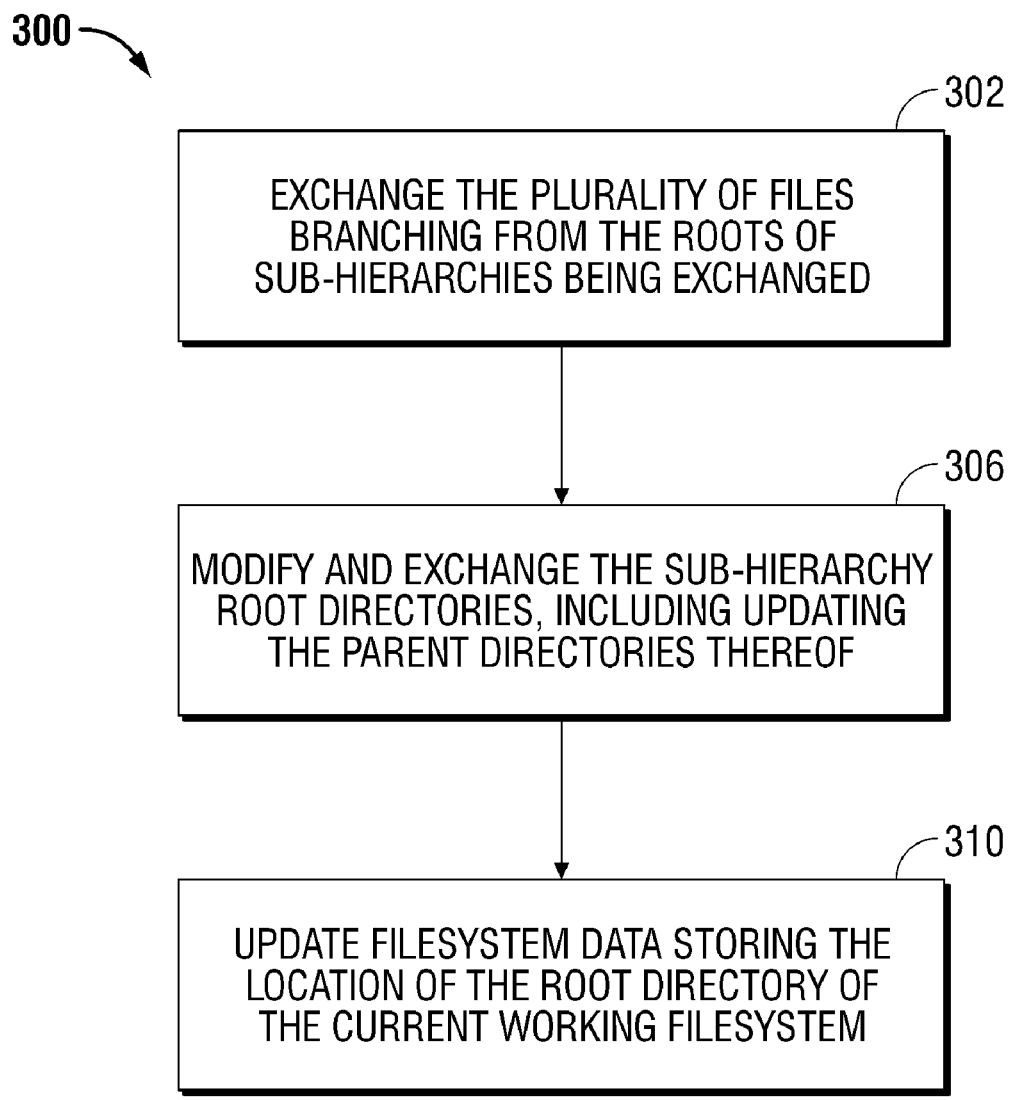
FIG. 3 is a flowchart showing procedural steps of a method for exchanging sub-hierarchies in accordance with the present invention.

With respect to FIG. 3, a flowchart 300 is shown with exemplary steps executed by the file system exchange software module 16 for implementing the process of exchanging sub-hierarchies 204a and 204c, while the working file system is changed from 204a to 204c. The exchanging procedure may be initiated by a user request or by a processor request. Preferably access by the at least one processor 14 to the HFS 200 is prevented once execution of step 302 has been commenced through completion of execution of steps 302, 306 and 310, other than access needed to execute the steps 302, 306 and 310. At step 302, files 208a, i.e., all files and all files in all directories except the backup container directory 210 and special files 212 branching directly from the sub-hierarchy root directory 206a, which is currently located in the HFS root directory 202 while sub-hierarchy 204a is the working file system, are reconfigured to branch directly from sub-hierarchy root directory 206c. Likewise, files 208c, i.e. all files and all files in directories branching from sub-hierarchy root directory 206c (not including those that were just reconfigured) are reconfigured to branch from the HFS root directory 202. A temporary storage location is provided to temporarily store pointers and other data being exchanged. At this point all of the files 208a, 208c of the sub-hierarchies 204a and 204c have been exchanged other than the respective root directories 206a and 206c.

At step 306, the sub-hierarchy root directories are exchanged, i.e., sub-hierarchy root directory 206a is moved to location L3, and sub-hierarchy root directory 206c is moved to location L1. The exchanging of the sub-hierarchy directories includes moving their contents and associated data such as parent pointers or special system files, depending on the actual HFS implementation used. The sub-hierarchy root directories are carefully altered in accordance with the file system implementation used to insure that the sub-hierarchy root directory 206c of the post-operation working file system includes features required for the root directory 202, and the sub-hierarchy root directory that was switched out of the root directory 202 no longer includes features exclusive to the root directory 202. Parent directories of the exchanged sub-hierarchy root directories are also updated to reflect the exchange. Exchanging working file systems using the FAT32 and NTFS HFS implementations are described in greater detail below with reference to FIGS. 4 and 5.

At step 310, file system data is updated to reflect the changes made to the root directory. For example the boot sector may be updated to record the fact that root location L1 now contains the sub-hierarchy root directory 206c.

The process of exchanging is preferably performed at an early stage in the startup (i.e., during booting) of the operating system. For additional protection from a hardware failure, power supply failure, etc., the exchange is preferably performed in a manner that insures that a readable file system exists substantially throughout the exchanging procedure. The exchanging procedure may alternatively be performed while an operating system associated with a current working file system is executing. Furthermore, with proper authorization selected files of the current working file system may be exchanged with selected files of one or more other sub-hierarchies rather than exchanging entire sub-hierarchies.

The exchange procedure includes exchanging positions of the sub-hierarchy root directories and reconfiguring the connections between the sub-hierarchy root directories to files/ and or directories that are directly connected to them (not necessarily in the order specified) so that each sub-hierarchy root is connected to the appropriate data. Copying of data is minimized, since the data connected to each respective sub-hierarchy root is not copied. Furthermore, connections between files and/or directories holding the data connected to the respective sub-hierarchy roots do not need to be reconfigured.

Figure 4:
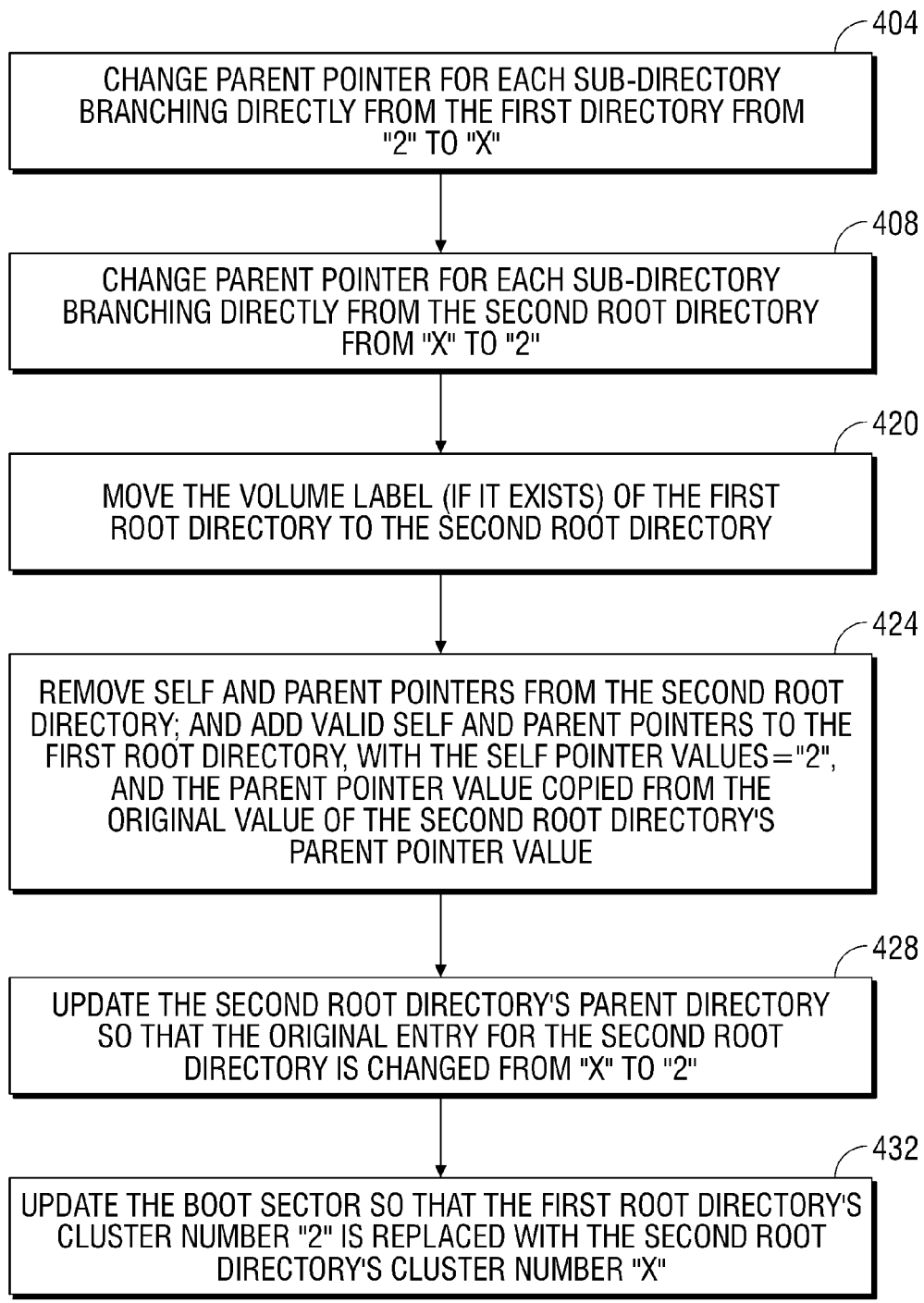
FIG. 4 is a flowchart of a first embodiment of the method shown in FIG. 3.

With reference to FIG. 4, a flowchart is provided to illustrate steps performed during an exchange procedure of a current working file system which is a first sub-hierarchy and a second sub-hierarchy using the FAT32 file system implementation.

The root directory of the working file system (herein referred to as the "first root directory") is located at the true root directory of the HFS, having starting cluster number "2" in this example. At the time that the second sub-hierarchy was created, the starting cluster number of its root directory (herein referred to as the "second root directory") was preferably stored for future use, such as during an exchange procedure. During an exchange procedure, the starting number of the second root directory may be retrieved from storage or may be interpreted by the HFS. If the HFS has been damaged or corrupted and is unable to be interpreted, the stored number may be retrieved. In this example, the starting cluster number of the second root directory is "X".

At step 404, a determination is made for each file stored in the root directory of the working file system to determine if the file is a subdirectory. If so, the parent pointer for the subdirectory is changed from "2" to "X". Ordinary files do not need modifications as they do not have a parent pointer.

At step 408, a similar procedure is followed for the files stored in the second root directory. The parent pointer for each subdirectory branching from the root directory of the alternate file system is changed from "X" to "2". At this point, all of the files branching from the first root directory have been exchanged with all of the files branching from the second root directory.

At step 420, the volume label (if it exists) of the first root directory is moved to the second root directory.

At step 424, self and parent pointers from the second root directory are removed, and valid self and parent pointers are added to the first root directory. The self pointer value is "2", and the parent pointer value is copied from the original value of the second root directory's parent pointer value (i.e. pointing to the backup container directory).

At step 428, the second root directory's parent directory (the backup container directory) is updated so that the original entry for the second root directory is changed from "X" to "2", so that the backup container directory now points to the first root directory.

At step 432, the boot sector is updated so that the first root directory's cluster number "2" is replaced with the second root directory's cluster number "X". This causes the computer to reference the second root directory while booting. The second root directory is now the true root directory of the FAT32 HFS.

Figure 5:
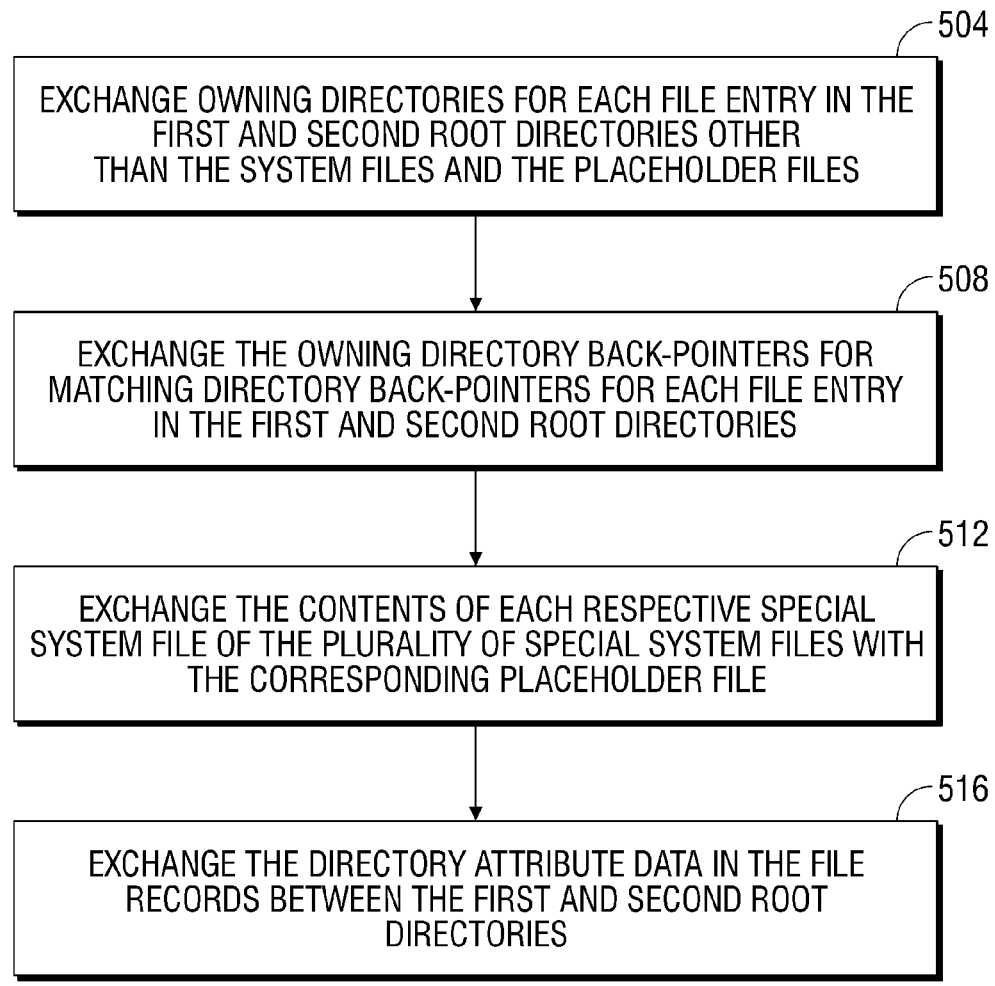
FIG. 5 is a flowchart of a second embodiment of the method shown in FIG. 3.

With respect to FIG. 5, a flowchart showing procedural steps of an exemplary NTFS (New Technology File System) implementation is provided. A first sub-hierarchy is provided having a first root directory occupying file record number "5", where first sub-hierarchy is the current working file system. A second sub-hierarchy, the alternate file system, is provided having a second root directory occupying file record number "Y", where "Y" is stored upon formation of the second sub-hierarchy and retrieved for an exchange procedure, and/or the file record number "Y" is obtained by interpreting the second sub-hierarchy. The first root directory is the true root directory of the HFS, and includes, in predetermined file records, a plurality of special system files for storing housekeeping data. The second root directory includes a placeholder file to correspond to each respective special system file stored in the first root directory, where each placeholder file has the same filename as the corresponding special system file. A placeholder file is also provided for the root directory name itself, which is named ".", ("dot"), which is an illegal filename otherwise, since it is reserved for the self-pointer of all directories. A placeholder of a similar name may be used, such as " . . . " ("dot-dot-dot"). Lastly, a placeholder file is provided for the backup container directory. The placeholder files are not used, and exist only to provide directory entries which maintain proper collation (sorting order) within the root directories.

The following description of the steps included in the flowchart of FIG. 5 uses NTFS nomenclature, as known to those skilled in the art. At step 504, each file entry in the first and second root directories other than the system files and the placeholder files are modified by exchanging their owning directories, i.e., the parent fileref field of each entry is changed from the first root directory to the second root directory, and vice versa. At step 508, the file records are modified for each file entry in the first and second root directories by exchanging the owning directory's back-pointers for the other directory's back-pointers, e.g., the file's FILE record's matching file info entry's parent fileref is exchanged for the parent fileref of the other root directory. It is possible that the affected file info entry is not located in the FILE record itself, but in a chained subrecord. In this case, both the subrecord and the main record are altered. Preferably, modifications made in steps 504 and 508 are performed using fixed-size fields so that the lengths of the directory records and/or the FILE records will not change.

At step 512, the FILE record of each respective special system file of the plurality of special system files is exchanged with the FILE record of the corresponding placeholder file. Preferably, the backup container directory is treated as a special system file, and exchanged accordingly. At step 516 the directory attribute data (directory listing) in the FILE records are exchanged between the first and second root directories, e.g., the $I30 (directory) $INDEX_ROOT, $INDEX_ALLOCATION and $BITMAP attributes are exchanged between the FILE records of the first and second root directories, performing the actual exchanging thereof.

It is possible that the combined lengths of the previously mentioned attributes differ between the two FILE records being exchanged. To accommodate this situation, the FILE record having a shorter length is grown (lengthened) before the exchange, and the other FILE record is shrunk (reduced in length) after the exchange. Furthermore, it is possible that the internal attribute-IDs associated with the previously mentioned attributes will differ between the two FILE records being exchanged. If so, either each attribute's attribute-ID is maintained during the exchange, or all attribute IDs (and the next-attribute-ID field) are recalculated for both FILE records being switched.

Steps 504-512 are preferably performed by walking through both directories in lockstep and treating each entry in accordance with steps 504-512 before proceeding to the next entry. An entry with a subnode flag is eight bytes longer than a matching entry without the subnode flag. Preferably, these last eight bytes are not exchanged, the subnode flag is not exchanged and is preserved, and the entry length word is not exchanged and is preserved. The FILE records and directory index records preferably use the conventional NTFS write-completion detection fixup scheme.

The NTFS implementation described, unlike the previous FAT32 implementation, does not require any modifications to the boot sector.

It will be understood that various modifications may be made to the illustrative embodiments disclosed herein. Therefore, the above description should not be construed as limiting, but merely as exemplifications of preferred embodiments. Those skilled in the art will envision other modifications within the scope and spirit of the claims appended hereto.

What is claimed is:

1. A method for replacing a first sub-hierarchy of a New Technology File System (NTFS) hierarchical filesystem (NTFS HFS) with a second sub-hierarchy, the method comprising the steps of:

providing for the first sub-hierarchy to include a first root directory having at least one special system file, wherein the first sub-hierarchy includes a first plurality of files configured to branch from the first root directory;

providing for the second sub-hierarchy to include a second root directory located in a second location of the HFS, the second root directory having at least one placeholder file corresponding to the at least one special system file, wherein the second sub-hierarchy includes a second plurality of files configured to branch from the second root directory; and configuring the first plurality of files to branch from the first root directory once the first root directory is accessed through the second location;

exchanging the first plurality of files with the second plurality of files; and exchanging at least one directory pointer corresponding to the at least one special system file with at least one directory pointer corresponding to the at least one placeholder file.

2. The method according to claim 1, wherein the NTFS HFS includes a plurality of file records storing directory attribute data corresponding with the first and second root directories.

3. The method according to claim 2, wherein the first root directory includes at least one file entry including a first owning directory having a first back-pointer and the second root directory includes at least one file entry including a second owning directory having a second back-pointer.

4. The method according to claim 3, wherein the replacing step further includes the steps of:

exchanging directory attribute data of the file record associated with the first root directory with directory attribute data associated with the second root directory; and exchanging the owning directory back-pointers of the first root directory with corresponding owning directory back-pointers of the second root directory.

5. The method according to claim 1, wherein the NTFS HFS includes a single parentless root directory and the first root directory is located in a first location of the HFS associated with the single parentless root directory of the HFS.

6. The method according to claim 5, wherein the at least one special system file is exclusive to the single parentless root directory.

7. A computer system comprising:

at least one processor;

a New Technology File System (NTFS) hierarchical filesystem (HFS) stored on a storage medium accessible by the at least one processor and including a single parentless root directory, the NTFS HFS further including:

a first sub-hierarchy having a first root directory located in a first location of the HFS associated with the single parentless root directory of the HFS through at least one internal pointer, the first root directory having at least one special system file, wherein the first sub-hierarchy includes a first plurality of files configured to branch from the first root directory; and a second sub-hierarchy having a second root directory located in a second location of the HFS, the second root directory having at least one placeholder file corresponding to the at least one special system file, wherein the second sub-hierarchy includes a second plurality of files configured to branch from the second root directory; and memory storing a set of programmable instructions executable on the at least one processor for replacing the first sub-hierarchy with the second sub-hierarchy comprising the step of:

associating the second root directory and the single parentless root directory of the HFS through the at least one internal pointer, wherein the associating step further comprises the steps of:

configuring the first plurality of files to branch from the first root directory once the first root directory is accessed through the second location;

exchanging the first plurality of files with the second plurality of files; and exchanging at least one directory pointer corresponding to the at least one special system file with at least one directory pointer corresponding to the at least one placeholder file.

8. The computer system according to claim 7, wherein the NTFS HFS includes a plurality of file records storing directory attribute data corresponding with the first and second root directories.

9. The computer system according to claim 8, wherein the first root directory includes at least one file entry including a first owning directory having a first back-pointer and the second root directory includes at least one file entry including a second owning directory having a second back-pointer.

10. The computer system according to claim 9, wherein the replacing step further includes the steps of:

exchanging directory attribute data of the file record associated with the first root directory with directory attribute data associated with the second root directory; and exchanging the owning directory back-pointers of the first root directory with corresponding owning directory back-pointers of the second root directory.

11. A method for replacing a first sub-hierarchy of a New Technology File System (NTFS) hierarchical filesystem (NTFS HFS) with a second sub-hierarchy, wherein the first sub-hierarchy includes a first root directory having at least one special system file, and a first plurality of files configured to branch therefrom, the second sub-hierarchy including a second root directory located in a second location of the HFS and a second plurality of files configured to branch from the second root directory, the second root directory having at least one placeholder file corresponding to the at least one special system file, the method comprising the steps of:

configuring the first plurality of files to branch from the first root directory once the first root directory is accessed through the second location;

exchanging the first plurality of files with the second plurality of files; and exchanging at least one directory pointer corresponding to the at least one special system file with at least one directory pointer corresponding to the at least one placeholder file.

12. The method according to claim 11, wherein the NTFS HFS includes a plurality of file records storing directory attribute data corresponding with the first and second root directories.

13. The method according to claim 12, wherein the first root directory includes at least one file entry including a first owning directory having a first back-pointer and the second root directory includes at least one file entry including a second owning directory having a second back-pointer.

14. The method according to claim 13, wherein the replacing step further includes the steps of:

exchanging directory attribute data of the file record associated with the first root directory with directory attribute data associated with the second root directory; and exchanging the owning directory back-pointers of the first root directory with corresponding owning directory back-pointers of the second root directory.

15. The method according to claim 11, wherein the NTFS HFS includes a single parentless root directory and the first root directory is located in a first location of the HFS associated with the single parentless root directory of the HFS.

16. The method according to claim 15, wherein the at least one special system file is exclusive to the single parentless root directory.

* * * * *